Figure 3:
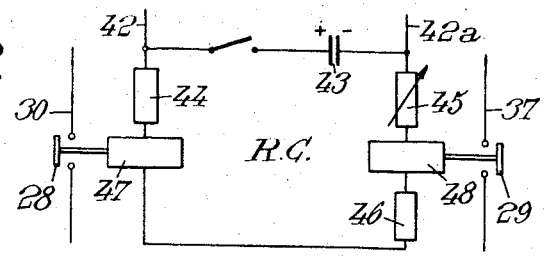

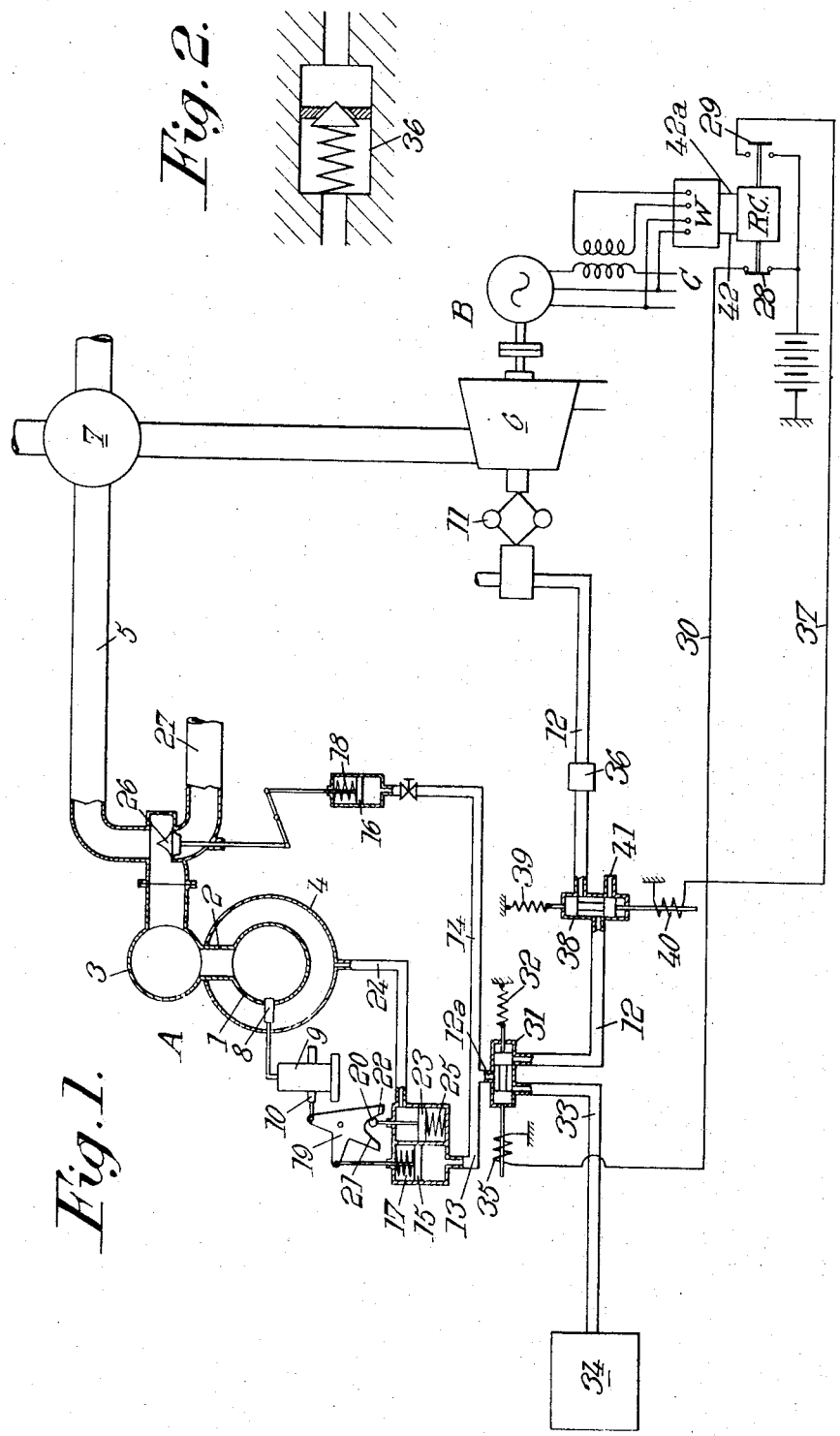

3,363,411
REGULATING MEANS OF POWER PLANTS COMPRISING AT LEAST ONE FREE-PISTON GAS GENERATOR
Pinchas Paul Szereszewski, Asnieres, France, assignor to Société d'Etudes et de Participations, Eau, Gaz, Electricite, Energie, S.A. (S.E.P.), Geneva, Switzerland
Filed Feb. 4, 1966, Ser. No. 525,249
Claims priority, application France, Feb. 9, 1965, 4,878
7 Claims. (Cl. 60—13)

This invention relates to means for regulating power plants comprising at least one free-piston gas generator, and more particularly though not exclusively to power plants in which the power gas is used to power a turbine driving an electric generator.

It is known to control the element which meters the amount of fuel injected into the motor cylinder of the gas generator or generators in the power plant by means of a regulator which operates in response to the load on the gas engine and particularly on the turbine supplied with power gas from the gas generator or generators. In most cases this regulator is a speed governor driven by the turbine and delivering to the fuel metering element(s) of the gas generator(s) control pulses usually consisting of pressure changes in a control liquid.

Since the gas generator output must be maintained between upper and lower limits that are in turn dependent on the pressure of the power gas delivered by the gas generator, it is necessary that the positions adpatable by the aforesaid governor remain between said limits. As is also known, the gas generator regulating means may, accordingly, be provided with abutment members which for each working pressure, in most instances the delivery pressure, of the gas generator determine the range over which the gas generator regulating element may be shifted responsively to the control pulses it receives from the governor of the gas turbine driven by the power gas.

During normal operation of the power plant, said stop members are usually inoperative on the regulating element, which element is restrained by the control pulses it receives, within the range referred to and at a certain distance from the abutments limiting this range.

Such regulating means will operate satisfactorily provided that variations in the load on the gas turbine are comparatively slow or of small magnitude. Consequently, such regulating means are not effective enough when the gas turbine is subjected to sudden and large changes in the load thereon.

This shortcoming of conventional regulating means can be ascribed to the large spaces existing between the compression section of each gas generator and the intake of the turbine driven by the power gas, examples of such spaces being the casing or enclosure containing the air for scavenging the gas generator motor cylinder, possible manifolds, large-diameter ducts and the like, which are filled with air or gas and which delay the moment when the change in the gas generator output or delivery, as a result of the pulse delivered from the turbine to the gas generator regulating element, becomes effective at the turbine inlet. For it will readily be understood that when a sudden increase in the load on the turbine calls for an an increase in the pressure at the inlet thereof, the entire gas content of the aforesaid spaces must contribute toward this pressure increase. The converse applies upon a sudden decrease in the load on the turbine, which requires a decrease in the pressure at the inlet thereof.

It has been proposed to overcome this drawback by filling the spaces between the turbine and the compressor section of the gas generator with a gas supplied from a source external to the gas generator when the load on the turbine increases suddenly, and to empty these spaces by uncovering an exhaust port when said load suddenly decreases. Such means, however, are complex and difficult to provide, particularly with regard to filling said spaces with a gas supplied by an external source.

The object of the present invention is to remedy these disadvantages by the use of simpler means to achieve a rapid response of the gas generator to a sudden change in the load on the turbine.

Another object of the invention is to provide the power plant, on the one hand, with means normally disoperatively connected with said fuel metering element to drive the same in a position where it permits a maximum fuel delivery and, on the other hand, with an auxiliary control device or regulator which, in response to a sudden change in the load on the gas engine, cuts off the fuel metering element from the governor, thereby rendering the same inoperative, while it renders the above means operative upon said fuel metering element.

A further object is to constitute said means normally disconnected with said fuel metering element, in the case where the latter is hydraulically controlled by said governor, by a source of fluid under high pressure.

According to one of the preferred embodiments of the invention there is provided, in addition to the control circuit which acts on the fuel metering element of the gas generator during the normal relatively slow and/or small load fluctuations on the gas engine, in particular the turbine, a second control circuit comprising a regulator which produces a control pulse only upon rapid and large variations in the turbine load, this control pulse rendering the former-mentioned control circuit inoperative and causing the aforesaid fuel metering element to be moved for a limited time interval against one or the other of the delivery-pressure-dependent limits of its range of movement, according as a suddenly increasing or suddenly decreasing load on the turbine is involved.

The regulator of the aforesaid second control circuit may be an accelerometer or a wattmeter associated to a differentiating circuit (or rate circuit) for indicating the rate of change in the load, (or derivative of change in the load with respect to time), or else a differential device which is activated simultaneously by a wattmeter and by an element subjected to the gas generator delivery pressure (such a differential device having been described in French Patent No. 1,016,885 filed Apr. 29, 1950).

Other features of the invention will become apparent from the description which follows, with reference to the accompanying non-limitative drawings, of an exemplary form of embodiment for use in a power plant comprising at least one free-piston gas generator supplying a gas turbine driving an electric generator.

Figure 4:
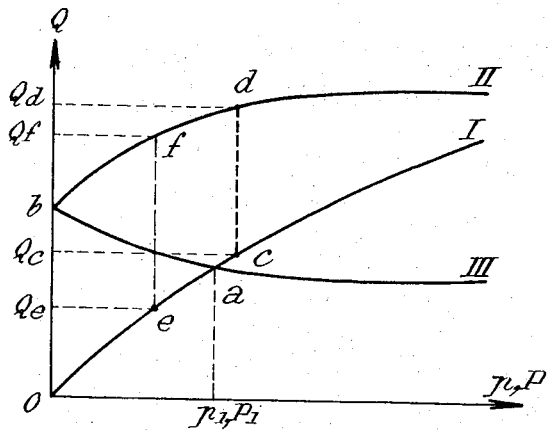
Figure 5:
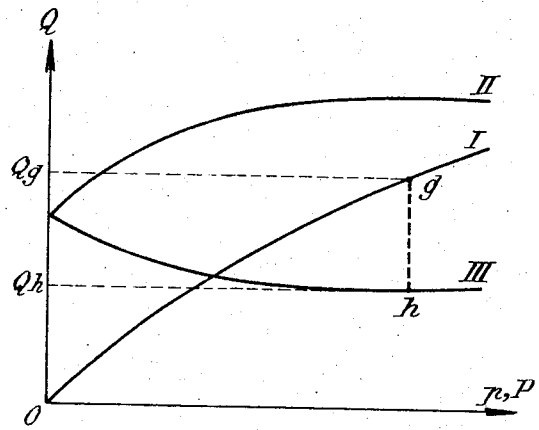

In the drawings:
FIGURE 1 shows diagrammatically a power plant according to the invention;
FIGURES 2 and 3 are detail views thereof; and
FIGURES 4 and 5 are two diagrams intended to give a clearer understanding of the results obtained with the invention.

Referring first to FIGURE 1, the letter A designates the power plant gas generator, diagrammatically represenated by a cross-section, through its motor cylinder 1 and the power gas exhaust duct 2 and manifold 3 thereof.

It should be noted that the power gas produced by the gas generator consists of a mixture of incompletely expanded combustion gas and compressed air having swept through the motor cylinder as scavenging air thereof. This air is compressed, during the inward stroke of the piston, in the compresser section of the gas generator, whence it is delivered into a casing 4 surrounding motor cylinder 1 and acting at the same time as a reservoir for supplying feed and scavenging air to motor cylinder 1.

Working inside the motor cylinder and the compressor section of the gas generator are free pistons which are driven outwardly upon combustion of the fuel injected into the motor cylinder of the gas generator, and inwardly by air cushions or "bounce chambers" which store up energy during the outward stroke of the pistons.

The motor cylinder operates on the two-stroke diesel cycle.

Free-piston gas generators of this kind are well known per se and require no further description.

Manifold 3 of gas generator A is connected through a conduit 5 either directly to the intake of the turbine 6 of an electric generating set B, or to an intermediate manifold 7 to which are connected other gas generators of the same power plant. Fuel injection into motor cylinder 1 is accomplished by means of an injector 8 fed by an injection pump 9. The quantity of fuel delivered each time by pump 9 and injected by injector 8 can be adjusted by a regulating element 10 which, as shown diagrammatically in FIGURE 1, may take form of a rack which causes the injection pump piston to rotate about its axis, said piston being accordingly formed with an oblique control ramp. Irrespective of the metering system adopted, the quantity of fuel injected will be dependent upon the variable position of regulating element 10.

The variations in the position of regulating element 10 are obtained by means of a first control circuit comprising a governer 11 which is driven by turbine 6 and produces in known manner pressure changes in a control liquid contained in a conduit 12. Conduit 12 is connected through a section 12a to two further conduits 13 and 14 for conveying the pressure of the control liquid to two pistons 15, 16 against the action in the opposite direction of springs 17, 18. The rod of piston 15 is connected through a bell-crank lever 19 to the aforesaid regulating element 10 of pump 9. If upon an increase in the load on turbine 6 the pressure in conduits 12, 13 should increase, element 10 will be shifted in the direction producing increased output from pump 9, whereas if said load decreases said element will be shifted in the direction producing reduced output from pump 9. The range of permissible movement of regulating element 10 is limited by a stop 20 which cooperates with two cam surfaces 21, 22 formed on lever 19, and the position of said cam depends on a working pressure, generally the delivery pressure from the gas generator. Cam surfaces 21 and 22 respectively determine the minimum and maximum quantities of fuel to be injected, for a given delivery pressure, from the gas generator. In order that the position of stop-member 20 should vary with said delivery pressure it is mounted on a piston 23, one side of which is subjected to the air pressure in casing 4 conveyed through a conduit 24, and the other side of which is acted upon by a countering spring 25. It is to be noted that the air pressure in casing 4 is for all practical purposes equal to the pressure of the gas delivered by the gas generator and contained in manifold 3.

Piston 16 is likewise actuated by the control-liquid pressure and controls a valve 26 which, depending on its position, interconnects gas generator manifold 3 with conduit 5 which conveys the power gas to turbine 6, or with an exhaust conduit 27 whereby the gas is discharged in manifold 3, or with both conduits 5 and 27 whereby part of the gas delivered by the gas generator is conveyed to turbine 6 and the remainder discharged.

The regulation process obtained with the contral circuit hereinbefore described is represented by the diagrams in FIGURES 4 and 5, in which the power-gas pressure $p$, which varies with the turbine load P, is plotted along the abscissa and the quantity of this power gas Q is plotted along the ordinate.

The power gas requirements of the turbine 6 in terms of the load thereon are shown by curve I, which indicates that an increase in the load causes not only the pressure $p$ but also the quantity Q of the power gas to increase.

Curves II and III respectively indicate the minimum and maximum quantities which the gas generator is capable of delivering as a function of the pressure. It will be noted that above the point of intersection $a$ of curves I and III, which point corresponds to a gas pressure $p_1$ and a turbine load $P_1$, the power-gas demand of the turbine lies in the interval between curves II and III, so that above a turbine load $P_1$ the gas generator output is capable of fully meeting the power gas requirements of the turbine. In contradistinction, for turbine loads below $P_1$, the minimum quantity of gas delivered by the gas generator is in excess of gas turbine requirements, so that part of this gas must be discharged into the open.

Under normal operating conditions of the power plant, the control circuit hereinbefore described is capable of adapting the pressure and quantity of power gas reaching the turbine intake to the needs of the turbine. For low turbine loads falling below the point $a$, the exhaust valve opens discharge conduit 27 to a greater or lesser extent, whereby notwithstanding the gas generator output indicated by section $b$–$a$ of curve III the quantity of gas reaching turbine 6 will in fact vary as shown by section 0–$a$ of curve I. During this interval (turbine load less than $P_1$ the quantity of fuel injected is limited through cam surface 21 being applied against stop 20. As soon as the turbine load exceeds $P_1$, i.e. when it corresponds to point $a$, valve 26 seals off discharge conduit 27 and fully opens conduit 5, whereby the whole of the gas delivered by the gas generator is conveyed to turbine 6. At the same time, stop 20 separates from cam surface 21 and does not normally contact either of cam surfaces 21 and 22 again but is positioned in the gap therebetween, with said surfaces performing strictly a safety function thereafter.

As already stated, the first control circuit described precedingly is entirely adequate for regulating the power plant provided that variations in the load on turbine 6 are relatively slow or small; it proves inadequate, on the contrary, when such load variations are sudden and large. If for example the turbine load jumps suddenly from 50% of full load to full load, it becomes necessary to instantly double the mass of gas contained in the various enclosures located downflow of the compressor section, i.e. in casing 4, manifold 3, conduit 5 and manifold 7 (where such is provided).

This requirement is met, in accordance with the main feature of this invention, by providing a second control circuit comprising a regulator or auxiliary control device which produces a control pulse only when such sudden and large variations occur. This second control circuit renders the first control circuit temporarily inoperative and immediately fetches regulating element 10 into its limit position defined by cam surface 21 or 22. Preferably, operation of said second control circuit is effective in closing discharge conduit 27 if the latter was open when the sudden increase in the load occurred, and in opening discharge conduit 27 when a sudden reduction in the load on turbine 6 occurs.

The operation process of the aforesaid second control circuit is shown in FIGURES 4 and 5.

If for instance an increase in the load on turbine 6 occurs when the load is at the point $c$ of curve I in FIGURE 4, which point lies in the interval between curves II and III and corresponds to a flow rate $Q_c$, then operation of the second control circuit will be effective in shifting regulating element 10 until cam surface 22 contacts stop 20, thereby producing a sudden increase in the flow rate up to point $d$ on curve II, which point corresponds to a flow rate $Q_d$. This ensures a very large immediate increase in the gas generator outflow.

Should the sudden increase in the load occur at a point $e$, that is at a point lying below curve III, for which valve 26 is open, operation of the second control circuit will be effective in producing both an immediate closure of discharge conduit 27 and an increase in the gas generator outflow rate from a value $Q_e$ corresponding to point $e$ to a value $Q_f$ corresponding to the point $f$ on curve II.

Conversely, should a sudden reduction in the load occur when the power plant is operating at point $g$ in FIGURE 5, operation of the second control circuit will be effective in immediately so shifting the regulating element 10 that the quantity of fuel injected into the gas generator is reduced until stop 20 contacts cam surface 21, whereby the outflow rate from the gas generator is immediately reduced from the value $Q_g$ to the value $Q_h$ corresponding to point $h$ on curve III. Preferably, operation of the aforesaid second control circuit is at the same time effective in opening valve 26 and hence discharge conduit 27.

After a certain time-lapse which is preferably adjustable and variable with the magnitude of sudden changes in the load on the turbine, the second control circuits becomes inoperative and the first control circuit resumes its function.

The aforesaid second control circuit may be devised in various ways.

The regulator associated to the second control circuit and shown in FIGURE 1 is a wattmeter regulator C to be described hereinbelow. This wattmeter regulator closes a switch 28 upon a sudden increase in the load on turbine 6 and closes a switch 29 upon a sudden decrease in the load on turbine 6.

Switch 28 is connected into the electric circuit 30 of an electrically operated valve 31 inserted between conduit 12 and section 12a of the first control circuit. Normally, that is as long as switch 28 is open, electrically operated valve 31 is held by a spring 32 in a position such that it provides communication between conduit 12 and section 12a and closes a conduit 33 having port in a pressure-oil reservoir 34. If upon a sudden increase in the load on turbine 6 switch 28 closes, electromagnet 35 of valve 31 is energized whereby pressure-oil reservoir 34 is caused to communicate through conduits 33, 12a, 13 and 14 with the working cylinders of pistons 15 and 16, and communication between conduit 12 and section 12a is cut off. The oil pressure provided by reservoir 34 instantly displaces piston 15 until stop 20 contacts cam surface 22, thereby causing the regulating element 10 to undergo the maximum shift corresponding to an increase in the quantity of fuel injected into the gas generator motor cylinder 1. Further, if valve 26 is in a position in which it opens conduit 27 fully or partly when a sudden increase in the load occurs, then the effect of the oil pressure from reservoir 34 on piston 16 will instantly move valve 26 into the position in which it seals off exhaust conduit 27 and fully opens conduit 5.

It should also be noted that for safety reasons a check-valve 36 is inserted into conduit 12. The purpose of this check-valve, of which FIGURE 2 is a sectional view, is to prevent pressure oil from reservoir 34 from reaching regulator 11 even if a leak occurs through electrically operated valve 31.

If switch 29 is closed due to a sudden decrease in the load on turbine 6, an electric circuit 37 will be effective in actuating an electrically operated valve 38 which is inserted into conduit 12 upflow of electrically operated valve 31. As long as switch 29 remains open, a spring 39 holds valve 38 in a position such that conduit 12 stays open; conversely, if switch 29 closes due to a sudden decrease in the load on turbine 6, electromagnet 40 of electrically operated valve 38 will move the latter into a position such that it establishes communication between the downflow section of conduit 12 and an exhaust conduit 41 and closes the upflow section of conduit 12, that is the section connected to regulator 11. As a result, piston 15 is immediately fetched by its spring 17 into a position in which cam surface 21 contacts stop 20, whereby regulating element 10 is immediately moved into the position corresponding to a minimum injection of fuel. Further, responsively to spring 18, piston 16 moves valve 26 into the position in which it opens exhaust conduit 27.

Considering new the wattmeter regulator which controls the second control circuit switches 28 and 29, this regulator consists of a wattmeter W and a differentiating circuit R.C. (Resistor-Capacitor Circuit) (see FIGURE 3), which circuit gives the derivative of the power indicated by wattmeter W with respect to time. This circuit is connected to wattmeter W through conductors 42, 42a and includes a capacitor 43 for providing the capacitance of circuit R.C., while resistors 44, 45, 46 (of which resistor 45 may be adjustable for example) and two relays 47, 48 respectively operate switches 28 and 29.

Relay 47 closes switch 28 only upon a sudden increase in the load on turbine 6, and relay 48 closes 29 only upon a sudden decrease in the load thereon. Further, relays 47 and 48 are so devised as to remain inoperative as long as variations in the load on turbine 6 remains below a given threshold. Once either of the relays has operated and closed the corresponding switch, this switch will remain closed for a time lapse dependent upon the capacitance of capacitor 43.

An additional advantage of the R.C. circuit resides in the fact that not only is the time for which it remains operative adjustable, but that, for a given adjustment, it automatically adapts this time to the magnitude of the sudden change in the load. The time for which the R.C. circuit remains operative is usually one to two seconds.

While there has been shown and described the presently preferred embodiment of the regulating system of this invention, it will be well understood by those skilled in the art that various changes and modifications may be made in this embodiment. By way of example, the function of governing the regulating element on the gas generator injection pump could be limited to sudden increases in the load on the turbine, it sufficing for valve 26 to open in the event of sudden decreases in the load on the turbine. It is, therefore, to be understood that the description hereinbefore set forth is not to be considered a limitation of the invention, but that changes may be made within the spirit and scope of the invention as set forth in the appended claims.

What I claim is:

1. A power plant comprising a free piston gas generator; a gas receiver engine;
   conduit means feeding the gases produced by said free piston generator to said gas receiver engine;
   a governor driven by said gas receiver engine;
   means for supplying fuel to said free piston gas generator;
   a movable regulating element controlled by said governor for metering the fuel delivery of said fuel supply means to said free piston gas generator per cycle of operation thereof;
   means normally disoperatively connected with said regulating element to drive the same in the position where it permits a maximum fuel delivery;
   and an auxiliary control device cutting off, in response to a sudden large increase in the load of said gas receiver, said regulating element from said governor and rendering the last mentioned means operative upon said regulating element.

2. A power plant according to claim 1 which comprises a fluid line operatively connecting said governor and said movable metering member to permit the fluid control thereof
   and valve means within said fluid line controlled by said auxiliary control device, said means disoperatively connected with said regulating element being constituted by a source of fluid under pressure which is permitted to act operatively on said regulating member upon actuation of said valve means by said auxiliary control device.

3. A power plant according to claim 1 wherein said auxiliary control device consists of a differential device responsive to the derivative of the load of the engine with respect to time.

4. A power plant according to claim 2 which further comprises an exhaust conduit to open, upstream from said gas receiver engine, an exhaust valve member controlling said exhaust conduit fluid operated by said governor and normally disoperatively connected with said auxiliary control device, said valve means cutting off said exhaust valve member from said governor upon its actuation by said auxiliary control device and rendering said source of fluid under pressure operative on said exhaust valve means to close said exhaust conduit.

5. A power plant comprising a free-piston gas generator;

a gas receiver engine;

conduit means feeding the gases produced by said free piston gas generator to said gas receiver engine;

a governor driven by said gas receiver engine;

means for supplying fuel to said free piston gas generator;

a movable regulating element controlled by said governor for metering the fuel delivery of said fuel supply means to said free piston gas generator per cycle of operation thereof;

means responsive to a working pressure of said free piston gas generator for limiting the motions of said regulating element between two limits where it controls respectively a maximum and a minimum delivery of fuel per cycle of operation, said limits being respectively predetermined in function of said working pressure;

an auxiliary control device, responsive to large and sudden changes in the load of said gas receiver engine, and means actuated by said auxiliary control device to cut off said governor from said regulating element and to control the operative displacement of the same towards the limit corresponding to a maximum fuel delivery, in the case of a sudden increase of load in said gas receiver engine and a minimum fuel delivery, and towards the limit corresponding to a minimum fuel delivery in the case of a sudden decrease in load of said gas receiver engine.

6. A power plant according to claim 5 which further comprises a fluid line operatively connecting said governor and said regulating element thereby permitting the hydraulic control thereof, a source of fluid under pressure;

said means actuated by said auxiliary control device to cut off said governor from said regulating element being constituted by valve means provided in said fluid line, said valve means connecting said movable regulating element operatively with said source in the case of a sudden increase of the load on said gas receiver engine and with the open in the case of a sudden decrease of the load on said gas receiver engine.

7. A power plant according to claim 6 wherein said valve means in said fluid line are two electrically controlled valves and wherein said auxiliary control device comprises two switches, a wattmeter and a differentiating resistor-capacitor circuit comprising two relays, said relays closing one of said switches when the derivative of the power indicated by said wattmeter W with respect to time exceeds a predetermined threshold, the closed switch operatively actuating one of said electrically controlled valves to connect said regulating element with either one of said source of fluid under pressure and of the open in correspondence with the sign of the load change.

References Cited
UNITED STATES PATENTS

| | | | |
|---|---|---|---|
| 2,760,337 | 8/1956 | Ciscel | 60—39.28 |
| 2,903,599 | 9/1959 | Huber | 60—13 |
| 2,971,338 | 2/1961 | Bodemuller | 60—39.28 |
| 3,128,750 | 4/1964 | Schmidt | 123—140.3 |

CARLTON R. CROYLE, *Primary Examiner.*

D. HART, *Assistant Examiner.*

UNITED STATES PATENT OFFICE
CERTIFICATE OF CORRECTION

Patent No. 3,363,411

January 16, 1968

Pinchas Paul Szereszewski

It is certified that error appears in the above identified patent and that said Letters Patent are hereby corrected as shown below:

Column 8, lines 2 and 3, cancel "and a minimum fuel delivery".

Signed and sealed this 29th day of July 1969.

(SEAL)
Attest:

Edward M. Fletcher, Jr.
Attesting Officer

WILLIAM E. SCHUYLER, JR.
Commissioner of Patents